(12) United States Patent
Cambric et al.

(10) Patent No.: US 12,259,968 B2
(45) Date of Patent: Mar. 25, 2025

(54) DETECTING ANOMALOUS POST-AUTHENTICATION BEHAVIOR FOR A WORKLOAD IDENTITY

(71) Applicant: Microsoft Technology Licensing, LLC, Redmond, WA (US)

(72) Inventors: Shinesa Elaine Cambric, Sachse, TX (US); Maria Puertas Calvo, Seattle, WA (US); Ye Xu, Kirkland, WA (US); Etan Micah Basseri, Seattle, WA (US); Sergio Romero Zambrano, Seattle, WA (US); Jeffrey Thomas Sakowicz, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 268 days.

(21) Appl. No.: 17/708,855

(22) Filed: Mar. 30, 2022

(65) Prior Publication Data

US 2023/0315840 A1    Oct. 5, 2023

Related U.S. Application Data

(60) Provisional application No. 63/309,322, filed on Feb. 11, 2022.

(51) Int. Cl.
*G06F 21/55* (2013.01)
*G06F 21/34* (2013.01)
*G06F 21/57* (2013.01)

(52) U.S. Cl.
CPC ............ *G06F 21/552* (2013.01); *G06F 21/34* (2013.01); *G06F 21/577* (2013.01); *G06F 2221/034* (2013.01)

(58) Field of Classification Search
CPC ...... G06F 21/522; G06F 21/34; G06F 21/577; G06F 2221/034
See application file for complete search history.

(56) References Cited

U.S. PATENT DOCUMENTS

| 11,537,902 | B1 * | 12/2022 | Aydore | G06N 3/047 |
| 11,902,327 | B2 * | 2/2024 | Wood | H04L 63/10 |

(Continued)

OTHER PUBLICATIONS

"International Search Report and Written Opinion Issued in PCT Application No. PCT/US23/010533", Mailed Date: May 4, 2023, 11 Pages.

(Continued)

*Primary Examiner* — Gary S Gracia
(74) *Attorney, Agent, or Firm* — Weaver IP L.L.C.

(57) ABSTRACT

Methods, systems, apparatuses, and computer-readable storage mediums described herein are configured to detect anomalous post-authentication behavior/state change(s) with respect to a workload identity. For example, audit logs that specify actions performed with respect to the workload identity of a platform-based identity service, a causing state change(s), while another identity is authenticated with the platform-based identity service, are analyzed. The audit log(s) are analyzed via a model for anomaly prediction based on actions. The model generates an anomaly score indicating a probability whether a particular sequence of the actions is indicative of anomalous behavior/state change(s). A determination is made that an anomalous behavior has occurred based on the anomaly score, and when anomalous behavior has occurred, a mitigation action may be performed that mitigates the anomalous behavior.

20 Claims, 7 Drawing Sheets

(56) References Cited

U.S. PATENT DOCUMENTS

| | | | | |
|---|---|---|---|---|
| 2005/0172306 | A1* | 8/2005 | Agarwal | G06F 11/008 |
| | | | | 714/E11.207 |
| 2016/0088000 | A1* | 3/2016 | Siva Kumar | H04L 63/1416 |
| | | | | 726/23 |
| 2017/0161478 | A1 | 6/2017 | Stavrou et al. | |
| 2017/0251013 | A1 | 8/2017 | Kirti et al. | |
| 2018/0316704 | A1 | 11/2018 | Joseph Durairaj et al. | |
| 2020/0134504 | A1* | 4/2020 | Li | G06N 5/00 |
| 2020/0285737 | A1 | 9/2020 | Kraus et al. | |
| 2020/0356676 | A1* | 11/2020 | Gorlamandala | G06F 21/577 |
| 2021/0264332 | A1* | 8/2021 | Pingali | G06N 5/022 |
| 2021/0279337 | A1* | 9/2021 | Mosby | G06F 21/577 |
| 2021/0327456 | A1* | 10/2021 | Yamaguchi | G10L 25/51 |
| 2022/0114245 | A1* | 4/2022 | Krishan | G06F 21/32 |
| 2023/0070546 | A1* | 3/2023 | Mosby | G06F 21/566 |
| 2023/0315840 | A1* | 10/2023 | Cambric | H04L 63/14 |
| | | | | 726/23 |
| 2024/0255939 | A1* | 8/2024 | Kanazawa | G06N 3/047 |

OTHER PUBLICATIONS

"Everything About Service Principals, Applications, And API Permissions", Retrieved from: https://m365internals.com/2021/07/24/everything-about-service-principals-applications-and-api-permissions/, Jul. 24, 2021, 14 Pages.

"What I Have Learned From Doing A Year Of Cloud Forensics In Azure AD", Retrieved from: https://m365internals.com/2021/07/13/what-ive-learned-from-doing-a-year-of-cloud-forensics-in-azure-ad/, Jul. 13, 2021, 25 Pages.

Li, et al., "Account Manipulation", Retrieved from: https://attack.mitre.org/techniques/T1098/, May 31, 2017, 3 Pages.

Robbins, Andy, "Introducing BloodHound 4.0: The Azure Update", Retrieved from: https://posts.specterops.io/introducing-bloodhound-4-0-the-azure-update-9b2b26c5e350, Nov. 20, 2020, 13 Pages.

Weinert, Alex, "Azure AD Workbook To Help You Assess Solorigate Risk", Retrieved from: https://techcommunity.microsoft.com/t5/azure-active-directory-identity/azure-ad-workbook-to-help-you-assess-solorigate-risk/ba-p/2010718, Dec. 22, 2020, 8 Pages.

* cited by examiner

DETECTING ANOMALOUS POST-AUTHENTICATION BEHAVIOR FOR A WORKLOAD IDENTITY

CROSS-REFERENCE TO RELATED APPLICATION(S)

This application claims priority to U.S. Provisional Patent Application No. 63/309,322, entitled "DETECTING ANOMALOUS POST-AUTHENTICATION BEHAVIOR FOR A WORKLOAD IDENTITY," and filed on Feb. 11, 2022, the entirety of which is incorporated by reference herein.

BACKGROUND

Cloud computing platforms offer higher efficiency, greater flexibility, lower costs, and better performance for applications and services relative to "on-premises" servers and storage. Accordingly, users are shifting away from locally maintaining applications, services, and data and migrating to cloud computing platforms. This migration has gained the interest of malicious entities, such as hackers. Hackers attempt to gain access to valid cloud subscriptions and access credentials in an attempt to steal and/or hold ransom sensitive data, or to leverage the massive amount of computing resources for their own malicious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to detect anomalous post-authentication behavior with respect to a workload identity. For example, audit logs that specify actions, which cause an associated state change(s) and are performed with respect to the workload identity of a platform-based identity service, are analyzed for periods of time during which an identity was authenticated with the platform-based identity service. The audit log(s) are analyzed via a model for anomaly prediction based on actions. The model generates an anomaly score indicating a probability whether a particular sequence of actions of the first plurality of actions is indicative of anomalous behavior. A determination is made that an anomalous behavior has occurred based on the anomaly score, and when anomalous behavior has occurred, a mitigation action(s) may be performed that mitigates the anomalous behavior.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
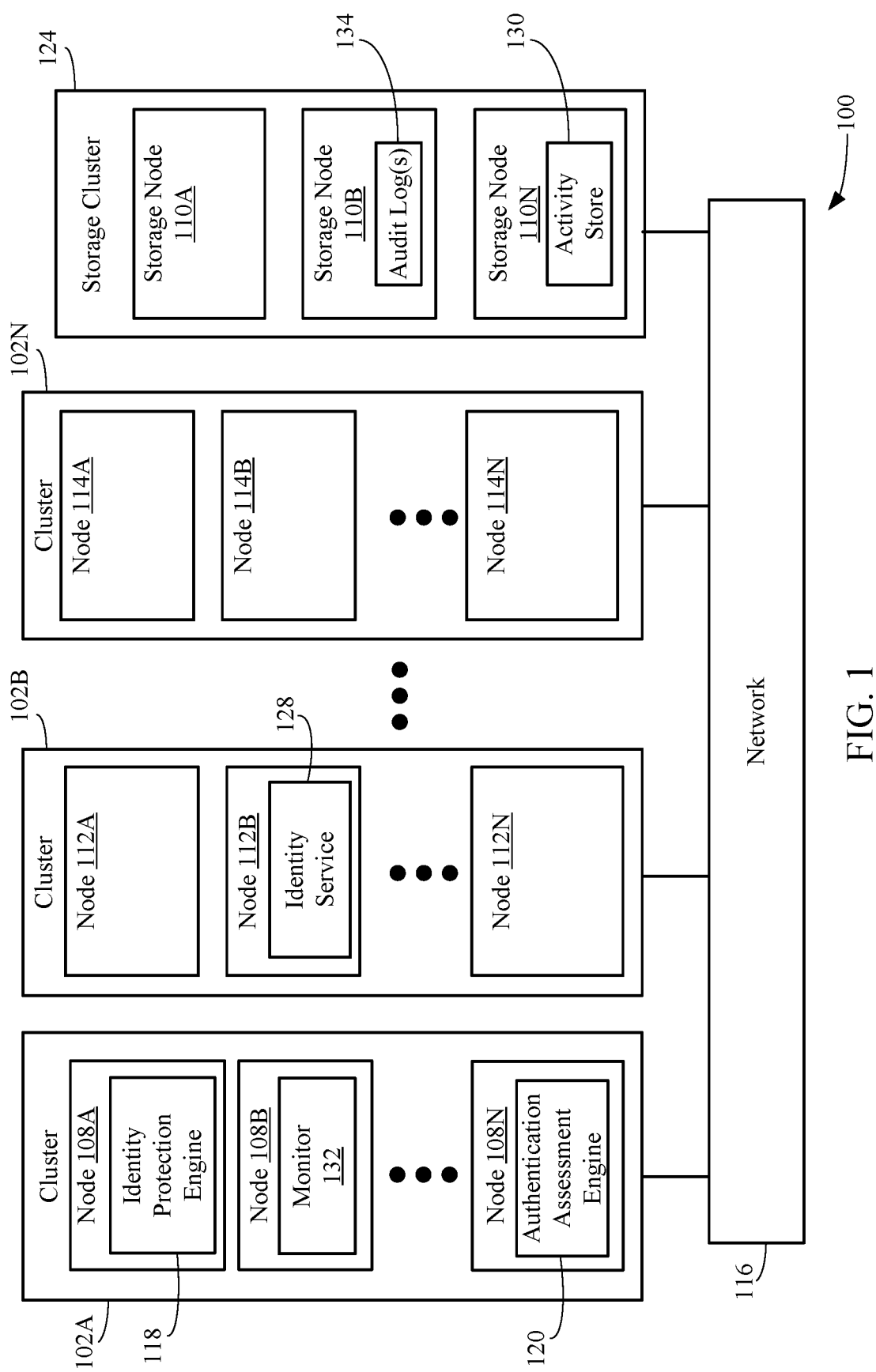
FIG. 1 shows a block diagram of an example network-based computing system configured to detect anomalous post-authentication behavior with respect to a workload identity in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below;" "up," "left," "right," "down," "top," "bottom," "vertical," "horizontal," etc.) used herein are for purposes of illustration only, and that practical implementations of the structures described herein can be spatially arranged in any orientation or manner.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Aspects described herein are directed to detecting anomalous post-authentication behavior/state change(s) with respect to a workload identity. For example, one or more audit logs that specify one or more actions (e.g., a plurality of actions), which cause an associated behavior/state change(s) and are performed with respect to the workload identity of a platform-based identity service, are analyzed, during a time in which an identity was actively authenticated with the platform-based identity service. The audit log(s) are analyzed via a model for anomaly prediction that is based on actions. The model generates an anomaly score indicating a probability of whether a particular sequence of the one or more actions is indicative of anomalous behavior. A determination is then made that an anomalous behavior/state change(s) has occurred based on the anomaly score meeting a threshold condition, while a determination is made that no anomalous behavior has occurred based on the anomaly score failing to meet the threshold condition. In response to determining that anomalous behavior has occurred, a mitigation action may be performed that mitigates the anomalous behavior.

The embodiments described herein provide improvements in other technologies, namely data security. For instance, the techniques described herein advantageously mitigate anomalous (e.g., malicious) accesses to resources (e.g., web applications, web services, user accounts, etc.) that occur, for example, to a workload identity via an identity that was successfully authenticated (e.g., via access credentials), thereby mitigating access to personal and/or confidential information associated with the resources, as well mitigating access to the network and computing entities (e.g., computing devices, virtual machines, etc.) on which the resources are provided. In addition, by mitigating the access to such computing entities, the unnecessary expenditure of compute resources (e.g., CPUs, storage devices, memory, power, etc.) associated with such entities is also mitigated. Accordingly, the embodiments described herein also improve the functioning of the computing entity on which such compute resources are utilized/maintained, conserving compute resources as a result of preventing a malicious entity from their utilization, e.g., for nefarious purposes such as, but not limited to data exfiltration, unauthorized viewing of emails, etc.

Unlike more traditional attempts to access restructured resources that involve bad actors with legitimate credentials, or stolen or otherwise misappropriated user identity credentials, attempts may be made using a workload identity as a vector for data exfiltration and environment compromise. In the context of this description, a workload identity may be an application, a service principal, a managed identity, and/or the like, which may in turn represent an application, web application, service, microservice, etc., including an instance thereof, which has some set of credentials (zero or more) associated therewith for access to another application, service, resource(s), etc.

Attack patterns of bad actors may target workload identities and use methods of privilege escalation of those workload identities as tactics to avoid detection. Aspects described herein provide for new detection methods that identify anomalous credential changes and post-authentication anomalous behavior for workload identities. That is, anomalous state changes and/or behaviors for workload identities are determined for periods of time during which an identity was authenticated by an identity service, such as a directory (e.g., Microsoft® Azure Active Directory™ published by Microsoft Corp. of Redmond, WA). State changes and/or behaviors for workload identities may be determined/identified using statistical algorithms, machine learning (ML) algorithms, and/or the like, which combine scores of suspicious workload identity sign-ins (e.g., via a separate sign-in detection algorithm) along with scores related to anomalous post-authentication state changes and/or behaviors of identities by the workload identity to flag and elevate risk reporting and/or mitigation associated with the workload identities. For simplicity and ease of description, changes and/or behaviors may be simply referred to as "state changes" hereinafter.

There are different scenarios in which an identity may be authenticated via credentials of workload identity in order to exploit credential changes by a workload identity of an existing application, service, or service principal that then uses the new or altered credentials to gain access to resources, to move laterally through the environment, etc., while hiding the malicious use of the identity behind the credential alterations. For instance, consider an illustrative scenario in which a workload identity that is an application uses "Credential_A" to authenticate to a directory each day. Once authenticated, the workload identity makes a web API call (once per day) to one or more resources in another application. Then, one day, the workload identity has "Credential_A" attached to it, or to its parent application object (e.g., globally), and after that, the workload identity makes 100 web API calls per day, targets still other applications for access, and ultimately exfiltrates data.

In another illustrative scenario, a user may be identified as having an elevated risk level, and that user creates a new "Credential_B" to which read/write permissions for directories and/or devices are assigned. If "Credential_B" is then utilized by the user to perform administrator consent, the new credential may be used to create additional user and workload identity accounts for exfiltration of data and may attempt to perform undetected lateral movements in the environment.

In a further illustrative scenario, a user may assign additional permissions to an existing workload identity credential (e.g., "Credential_C") that grants permissions to read mail in an email service. "Credential_C" is then used to perform multiple reads of email accounts, resulting in "Credential_C" being used to extract sensitive emails.

It should be noted herein that while embodiments are generally directed to anomalous post-authentication behavior of workload identities, state changes that enable modifications to and actions taken by workload identities may be brought about through various "identity" types, which may include, without limitation or even mutual exclusion, user identities, workload identities, administrator identities, etc. Therefore, even when embodiments herein exemplarily describe changes in states, credentials, activity patterns, etc., during authentication of, or by actions of, an "identity" or a "user identity," or the like, such illustrative examples are not limiting, and aspects herein contemplate that any "identity," as noted above may be applicable to such examples.

Accordingly, the aspects herein provide for solutions to issues associated with workload identities as vectors for data exfiltration and environment compromise via privilege escalation, and further enable the ability to apply additional security confidence to findings through pairing workload identities activity information with user identity sign-in information. These and other aspects for detecting anomalous post-authentication behavior/state change(s) with respect to a workload identity will be described in further detail herein in association with the Figures, and in the Sections/Subsections of description that follow below:

For example, FIG. 1 shows a block diagram of an example network-based computing system 100 configured to detect anomalous post-authentication behavior with respect to a workload identity, according to an example embodiment. As shown in FIG. 1, system 100 includes a plurality of clusters 102A, 102B and 102N and a storage cluster 124. Each of clusters 102A, 102B and 102N and storage cluster 124 are communicatively coupled to each other via network 116. Network 116 may comprise one or more networks such as local area networks (LANs), wide area networks (WANs), enterprise networks, the Internet, etc., and may include one or more of wired and/or wireless portions.

Clusters 102A, 102B and 102N and/or storage cluster 124 may form a network-accessible server set (e.g., a cloud-based environment or services platform (e.g., an environment/platform hosting types of resources, services, and/or applications). Each of clusters 102A, 102B and 102N may comprise a group of one or more nodes (also referred to as compute nodes) and/or a group of one or more storage nodes. For example, as shown in FIG. 1, cluster 102A includes nodes 108A-108N, cluster 102B includes nodes 112A-112N, and cluster 102N includes nodes 114A-114N. Each of nodes 108A-108N, nodes 112A-112N, and/or nodes 114A-114N are accessible via network 116 (e.g., in a "cloud-based" embodiment) to build, deploy, and manage applications and services. Storage cluster 124 comprises one or more storage nodes 110A-110N. Each of storage node(s) 110A-110N comprises a plurality of physical storage disks that are accessible via network 116 and is configured to store data associated with the applications and services managed by nodes 108A-108N, nodes 112A-112N, and/or nodes 114A-114N.

In an embodiment, one or more of cluster 102A, cluster 102B, and cluster 102N, and/or storage cluster 124, may be co-located (e.g., housed in one or more nearby buildings with associated components such as backup power supplies, redundant data communications, environmental controls, etc.) to form a datacenter, or may be arranged in other manners. Accordingly, in an embodiment, one or more of cluster 102A, cluster 102B, and cluster 102N, and/or storage cluster 124, may be a datacenter in a distributed collection of datacenters.

Each of node(s) 108A-108N, node(s) 112A-112N, and node(s) 114A-114N may comprise one or more server computers, server systems, and/or computing devices. Each of node(s) 108A-108N, node(s) 112A-112N, and node(s) 114A-114N may be configured to execute one or more software applications (or "applications," e.g., as a type of workload identity) and/or services and/or manage hardware resources (e.g., processors, memory, etc.), which may be utilized by users (e.g., customers or tenants in cloud-based platforms) of the network-accessible server set. Node(s) 108A-108N, node(s) 112A-112N, and node(s) 114A-114N may also be configured for specific uses. For example, as shown in FIG. 1, node 108A may be configured to execute an identity protection engine 118, node 108N may be configured to execute an authentication assessment engine 120, and node 112B may be configured to execute an identity service 128. It is noted that instances of identity protection engine 118, authentication assessment engine 120, and/or identity service 128 may be executing on other node(s) (e.g., node(s) 108B-108N, node(s) 112A-112N, and/or node(s) 114A-114N) in lieu of or in addition to node 108A, node 108N, node 112B, and node 108B, respectively. It is further noted that one or more of identity protection engine 118, authentication assessment engine 120, and/or identity service 128 may be incorporated with each other.

Identity service 128 may be configured to maintain a plurality of user identities by which associated users may utilize to access one or more devices, applications, and/or services maintained by system 100 (e.g., web application and/or services hosted and/or executed by any of node(s) 108A-108N, node(s) 112A-112N, and/or node(s) 114A-114N) and/or associated with identity service 128. Likewise, identity service 128 may be configured to maintain a plurality of workload identities, and associated credentials, which may be used for authentication and access. For example, each identity may be associated with an account that is able to be authenticated via authentication credentials (e.g., a username and password, and/or the like) associated therewith. When a workload identity is used to access a device, application, or service associated with identity service 128, the authentication credentials are provided to identity service 128. Identity service 128 may prompt for authorization credentials. Identity endpoint 106 verifies the identity of the account by validating the authorization credentials. In response to a successful validation, the account/workload identity is provided access to the device, application, and/or service. An example of identity service 128 may include a directory, such as but without limitation, Microsoft® Azure Active Directory™ published by Microsoft Corp. of Redmond, WA.

Authentication assessment engine 120 may be configured to monitor the authentication process and assess whether the credentials utilized to authenticate an identity were compromised. For instance, authentication assessment engine 120 may be configured to perform behavior tracking, where certain authentication-related features and/or characteristics of a plurality of users are tracked. Such characteristics may be stored in an activity store 130 maintained by one of storage nodes 110A-110N (e.g., storage node 110N). Activity store 130 may store an entry for each identity being tracked. Each entry of an identity may comprise a list of authentication features associated with the identity. Examples of authentication features include, but are not limited to, IP (Internet Protocol)-related features (e.g., an IP address utilized during an authentication process, an autonomous system number (ASN), which indicates the organization that owns the IP, a location (e.g., a latitude/longitude pair) that indicates the geographical location of the IP address, etc.), a device utilized during the authentication process, a tenant IP subnet associated with the authentication process (e.g., a calculated feature where /24 IP subnets are associated to the user's tenant as likely being corporate IPs), an EAS (Exchange ActiveSync) device associated with the authentication process, a browser ID of a browser utilized during an authentication process (e.g., an identifier for a persistent cookie stored in the user's device by the browser), etc. It is noted that the authentication features described herein are purely exemplary and that fewer, additional, and/or other features may also be utilized.

For each of the features stored in activity store 130, the following information is stored: the number of times the identity has authenticated with the feature, the frequency the identity has authenticated with that feature, the standard deviation of the frequency the identity has authenticated with the feature, and the timestamp of the last time the account authenticated with last feature. The count, frequency, standard deviation, and timestamp for each feature may be periodically recomputed and stored in activity store 130.

Authentication assessment engine 120 may be further configured to perform feature matching. Every time an identity authenticates successfully with a device, application, or service, the features of the authentication are extracted and compared to the identity's features stored in the activity store 130. For example, the IP address used during the authentication is compared to all the IP addresses associated with the identity that are stored in activity store 130. If the feature is found in activity store 130, a match pattern is computed. The match pattern for the feature may be based on an analysis of the count, frequency, standard deviation and last seen timestamp that are stored for that feature in activity store 130. Based on this analysis, a feature match can be considered frequent active, frequent inactive, occasional active, occasional inactive or rare. A match pattern of frequent active for a particular feature means that the user frequently authenticates and has recently authenticated with that feature. A match pattern of frequent inactive for a particular feature means that the user frequently authenticates and has not recently authenticated with that feature. A match pattern of occasional active for a particular feature means that the user occasionally authenticates and has recently authenticated with that feature. A match pattern of occasional inactive for a particular feature means that the user occasionally authenticates and has not recently authenticated with that feature. A match pattern of rare means that the user rarely has authenticated with that feature. It is noted that other match patterns may also be utilized. If the authentication feature does not match any of the features stored in activity store 130 for that feature type, the feature is considered a no-match.

Authentication assessment engine 120 may be further configured to determine the risk of the authentication based on the match score. For instance, the probability of account compromise is evaluated at different values of the match score. This may be performed based on empirical data collected from known compromised authentications. Once the probability of compromise is determined for every match score, thresholds may be set for detection. For example, a low-risk threshold, a medium risk threshold, and a high-risk threshold may be set. The low-risk threshold may represent the probability of compromise at that score range is low. The medium risk threshold may represent the probability of compromise at that score range is medium. The high-risk threshold may represent the probability of compromise at that score range is high. The thresholds may be set based on the match scores determined for the distribution of users. When an authentication process occurs with respect to a device, application, and/or service resource, authentication assessment engine 120 determines the match score and compares it the various risk level thresholds.

Authentication assessment engine 120 may generate and/or output an authentication risk score indicating a probability of whether the user credentials were compromised at the time of authentication. For instance, authentication assessment engine 120 may generate and/or output a first authentication risk score if the match score corresponds to a high-risk level threshold, may generate and/or output a second authentication risk score if the match score corresponds to a medium risk level threshold, or may generate and/or output a third authentication risk score if the match score corresponds to a low risk level.

Monitor 132 is configured to monitor actions performed on workload identities by other workload identities and/or by user identities with respect to identity service 128 after the user identities have been authenticated by and remain authenticated with identity service 128, as well as actions subsequently taken by workload identities. Such actions include, but are not limited to, credentials being added by a medium- or high-risk user, credentials being added to a workload identity that previously had zero credentials, an appearance of uncommon combination of credentials (e.g., password credentials added to a workload identity that previously only had certificates or symmetric keys, or vice versa), a deviation in an access pattern of the workload identity (e.g., accesses to a new application inconsistent with previous access patterns, high activity and exhibition of new access patterns when previously inactive, performing application consent on behalf of another identity and exhibiting new access patterns, etc.), a creation of a new workload identity by the service principal, a self-signed certificate(s) being added to a workload identity that previously only had certificates from the same certificate authority (or if the actor uses a certificate authority via an anomalous issuer), a user adding credentials to a workload identity after making a relatively low amount of other management operations in the past for other applications, a user adding credentials to a workload identity that previously only had credentials added by another user(s), credentials being added to a workload identity that include the workload identity in a new group or in a new directory role, an elevation of a privilege(s) of the workload identity, credentials being added via a different source application than is normally used in a tenancy (e.g., if the organization typically uses an application to manage credentials, then a PowerShell is used), credentials being added with a significantly different expiry/lifetime compared to the other credentials in the tenancy, multiple credentials (especially of different types) being simultaneously used for token acquisition at the same time by the same application, but from different IPs, (but consistent), credentials being added that key off of different API calls compared to the other credentials in the tenancy, credentials being added to a workload identity of a first tenant which is backed by a multi-tenant application registered in a second tenant (e.g., when the multi-tenant application rarely has credentials added "locally," as with a workload identity), credentials being used to request tokens to a resource API from a workload identity that no other credentials for that workload identity has ever requested tokens for (e.g., when follow-up API calls are very different than previous API calls), and/or the like.

Monitor 132 may also be configured to monitor access to and/or actions taken with respect to applications, services, and/or data objects (e.g., managed by such applications and/or services). For example, each time a data object is accessed (e.g., created, opened, closed, modified, deleted, etc.), monitor 132 detects the access. Examples of data objects include, but are not limited to, a data file, a database object (e.g., a table, a directory, etc.), structured data, unstructured data, semi-structured data, a data container, etc.

For each user identity and/or workload identity, monitor 132 may be configured to generate a respective record of the above-described actions performed and store the record via one or more audit logs 134, which may be stored in a storage node (e.g., storage node 110B). For each action, audit log(s) 134 may specify an identifier and/or a type for the action, a time stamp indicating a time at which the action occurred, a network address (e.g., an IP address) from which the action was initiated, a user identity that initiated and/or performed the action, a workload identity when applicable, etc. Each audit log of audit log(s) 134 may store a day's worth of actions. However, the embodiments described herein are not so limited, and each audit log of audit log(s) 134 may store multiple days' worth of actions or partial days' worth of actions.

Identity protection engine 118 is configured to analyze audit log(s) 134 for a given user identity and workload identity, and to determine whether anomalous behavior has occurred for the workload identity with respect to the user identity post-authentication (e.g., actions occurring while the user identity was authenticated). For instance, identity protection engine 118 may utilize a model for anomaly prediction based on actions that analyzes one or more sequences of actions identified by audit log(s) 134 (which may also include one or more of the times at which each of the actions occurred, a duration of time between the actions occurring, and/or the IP address from which the actions were initiated) and generate an anomaly score based on the analysis. This "action" or "anomaly prediction" model may, for any given action within the sequence(s) of actions, determine a conditional probability that the action in the sequence(s) of actions occurs after one or more other actions from the sequence(s) of actions. For any given sequence, the determined conditional probabilities may be aggregated to represent an overall sequence probability.

This resulting probability corresponds to an anomaly score for the given sequence. For a given sequence of actions, identity protection engine 118 may determine whether the determined anomaly score meets a threshold condition. If the threshold condition is met, then identity protection engine 118 may determine that anomalous behavior has occurred with respect to the workload identity being analyzed. If the threshold condition is not met, then identity protection engine 118 may determine that anomalous behavior has not occurred with respect to the workload identity being analyzed.

In an embodiment, identity protection engine 118 may also consider the authentication risk score provided by authentication assessment engine 120 when determining whether anomalous behavior has occurred with respect to a user identity. For instance, identity protection engine 118 may combine the authentication risk score with the anomaly score to generate a combined score. Identity protection engine 118 may determine whether the combined score meets the threshold condition.

In one aspect, the threshold condition may be a predetermined value. In such an aspect, identity protection engine 118 may be configured in one of many ways to determine that the threshold condition has been met. For instance, identity protection engine 118 may be configured to determine that the threshold condition has been met if the anomaly score (or combined score) is less than, less than or equal to, greater than or equal to, or greater than the predetermined value, and may include upward or downward crossings/meetings of threshold values.

In response to determining that anomalous behavior has occurred with respect to the workload identity, identity protection engine 118 may initiate, recommend, and/or cause a mitigation or remedial action to be performed that mitigates or remediates the anomalous behavior. For example, identity protection engine 118 may issue a notification (e.g., to an administrator, customer, tenant, etc.) that indicates anomalous behavior has been detected, provides a description of the anomalous behavior (e.g., by specifying the actions in the sequence of actions determined to be anomalous, specifying the IP address(es) from which the actions initiated, times at which the actions occurred, etc.), cause the user identity to be removed from identity service 128, cause access to a resource (e.g., an application, a service, a data object, etc.) that was previously-accessible by the user identity to be restricted for the user identity, and/or the like. The notification may comprise a short messaging service (SMS) message, a telephone call, an e-mail, a notification that is presented via an incident management service, a security tool (e.g., Microsoft® Defender for Cloud™ published by Microsoft® Corp, Microsoft® Sentinel™ published by Microsoft® Corp., etc.) configured to display security risks, the anomaly score, enable a user to harden resources, change security settings, change permission settings, etc. Identity protection engine 118 may cause a user identity to be removed from identity service 128 by sending a command to identity service 128 that causes identity service 128 to remove the user identity therefrom. Identity protection engine 118 may cause access to a resource to be restricted (e.g., by restricting, limiting, or preventing access) for the user identity by sending a command to identity service 128 that causes identity service 128 to update access and/or permission settings for the user identity with regards to the resource.

In the context of workload identities specifically, the remedial action performed may include, without limitation, removing and replacing one or more active credentials of the workload identity, auditing administrator access to the workload identity, locking or restricting a permission to a web API of the workload identity, etc. One or more remedial actions for workload identities may be caused to be performed by identity service 128, may be performed at a compute node in a tenancy by a tenant, may be automatically performed in whole or in part by identity protection engine 118, and/or the like, in various aspects contemplated herein. In some aspects, the remedial action may comprise the providing of a notification(s) to an administrator, customer, tenant, etc.

In some aspects, as noted below, the "action" or "anomaly prediction" model described herein may be persisted by one of the storage nodes and may be utilized by one of the compute nodes, as illustrated for system 100 of FIG. 1.

Figure 2:
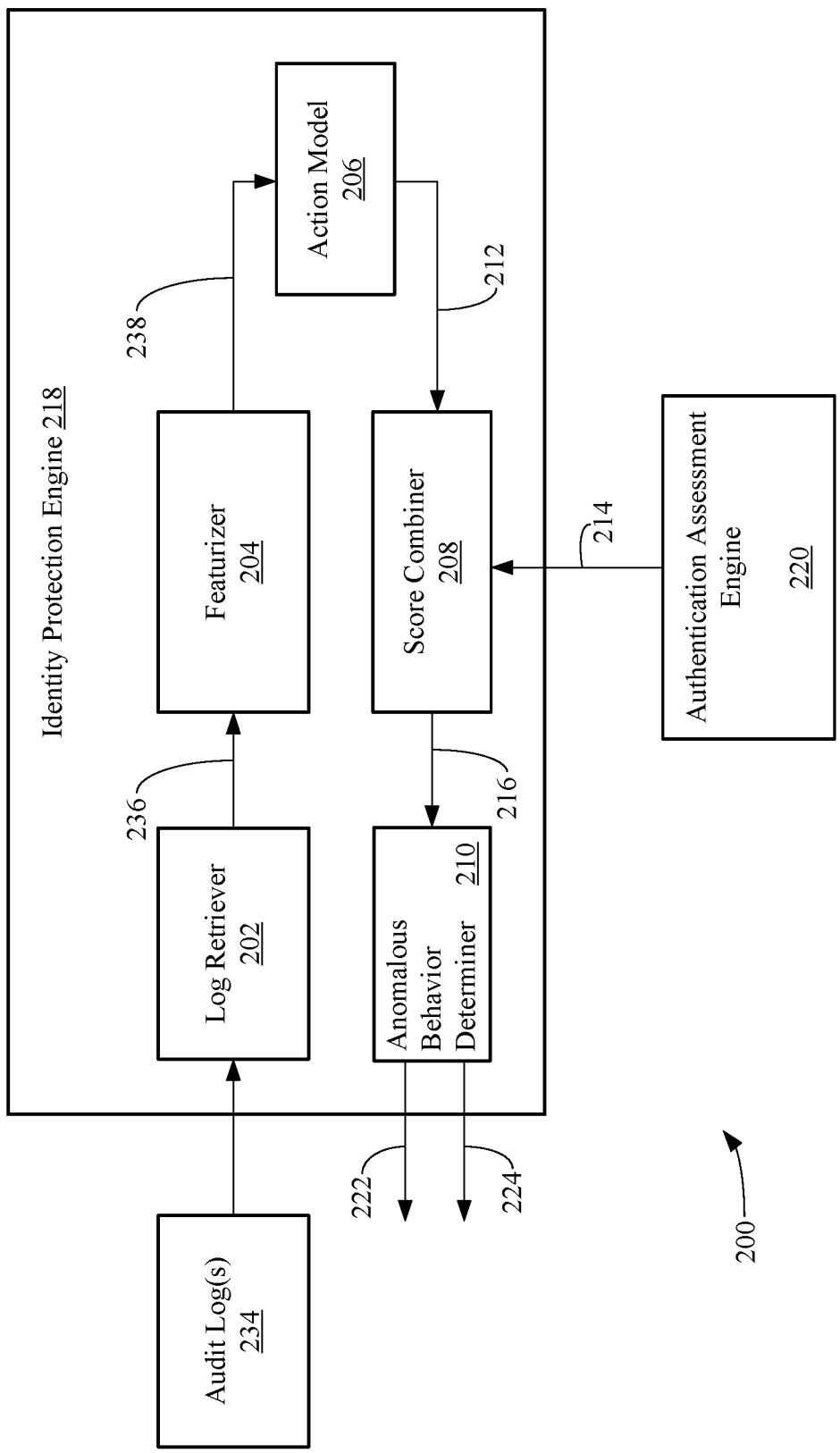
FIG. 2 depicts a block diagram of a system for detecting anomalous post-authentication behavior with respect to a workload identity.

FIG. 2 depicts a block diagram of a system 200 for detecting anomalous post-authentication behavior with respect to a workload identity, according to an example embodiment. As shown in FIG. 2, system 200 comprises an identity protection engine 218 and an authentication assessment engine 220. Identity protection engine 218 and authentication assessment engine 220 are examples of identity protection engine 118 and authentication assessment engine 120, as respectively described above with reference to FIG. 1. Identity protection engine 218 may comprise a log retriever 202, a featurizer 204, an action model 206, a score combiner 208, and an anomalous behavior determiner 210.

Log retriever 202 is configured to retrieve one or more audit logs 234, which are examples of audit log(s) 134, as described above with reference to FIG. 1. Log retriever 202 may be configured retrieve audit log(s) 234 on a periodic basis (e.g., hourly, daily, weekly, monthly, etc.). However, it is noted that the embodiments described herein are not so limited. For instance, log retriever 202 may be configured to retrieve audit log(s) 234 responsive to receiving a command initiated by a user (e.g., an administrator) or another application, or in some other asynchronous manner. In an embodiment, log retriever 202 is configured to retrieve audit log(s) 234 over a specified period of time for anomalous state change determinations (e.g., the audit logs generated in the last one, two, three, or seven days). By limiting the audit log(s) 234 that are retrieved to a specific period of time, the amount of data to be processed is also limited, thereby advantageously conserving compute resources (e.g., processing cycles, memory, storage, etc.). To retrieve audit log(s) 234, log retriever 202 may provide a query to a data store (e.g., a database) that stores audit log(s) 234. The query may specify a workload identity, a corresponding user identity, and/or a time range for audit log(s) 234 (e.g., the last seven days of audit log(s) 234 for workload identity 'A'). The subset of audit logs retrieved (shown as audit log(s) 236) are provided to featurizer 204.

Featurizer 204 may be configured to extract data from audit log(s) 236. The data include, but is not limited to, an identifier and/or a type for each action specified by audit log(s) 236, a time stamp indicating a time at which each action occurred, a network address from which each action was initiated, etc. Featurizer 204 may be also configured to generate one or more feature vectors 238 based on the data extracted from audit log(s) 236, which are provided to action model 206. Feature vector(s) 238 generated by featurizer 204 may take any form, such as a numerical, visual, and/or textual representation, or may comprise any other form suitable for representing audit log(s) 236. In an embodiment, feature vector(s) 238 may include features such as keywords, a total number of words, and/or any other distinguishing aspects relating to actions associated with audit log(s) 236 that may be extracted therefrom. Featurizer 204 may operate in a number of ways to featurize, or generate feature vector(s) 238 for, a given audit log of audit log(s) 236. For example and without limitation, featurizer 204 may featurize a given audit log of audit log(s) 236 through time series analysis, keyword featurization, semantic-based featurization, digit count featurization, and/or n-gram-TFIDF featurization.

Action model 206 may be a machine learning (ML) model that is configured to receive feature vector(s) 238. For example, action model 206 may be configured to analyze one or more sequences of actions, the times at which each of the actions occurred, a duration of time between the actions occurring, and/or the IP address from which the actions were initiated as (identified by audit log(s) 236 and represented by feature vector(s) 238) and generate an anomaly score 212 based on the analysis. For example, action model 206 may, for any given action within the sequence(s) of actions, determine a conditional probability that the action in the sequence(s) of actions occurs after one or more other actions from the sequence(s) of actions. Put another way, action model 206 may generate an anomaly score for one or more sequence combinations of the state change actions identified by audit log(s) 236 for a workload identity. As described below with reference to FIG. 8, the probability is determined based on a training process that is performed for action model 206, where historical audit logs generated for a plurality of workload identities are analyzed to determine relationships between actions performed therefor (e.g., the likelihood that a particular action occurs after another action for a workload identity that does not exhibit anomalous behavior, the likelihood that a particular action occurs after another action for a workload identity that exhibits anomalous behavior, etc.). For any given sequence of actions, the determined conditional probabilities are aggregated, according to aspects described herein. The resulting probability corresponds to anomaly score 212 for the given sequence of actions (described in further detail below). It is noted that while the embodiments described with reference to FIG. 2 are directed to machine learning model-based action model 206 by way of example and illustration, the embodiments described herein are not so limited. For instance, action model 206 may be configured to utilize statistical modeling-based techniques (e.g., linear regression-based statistical modeling techniques, logistic regression-based statistical modeling techniques, re-sampling-based statistical modeling techniques, etc.).

Figure 3:
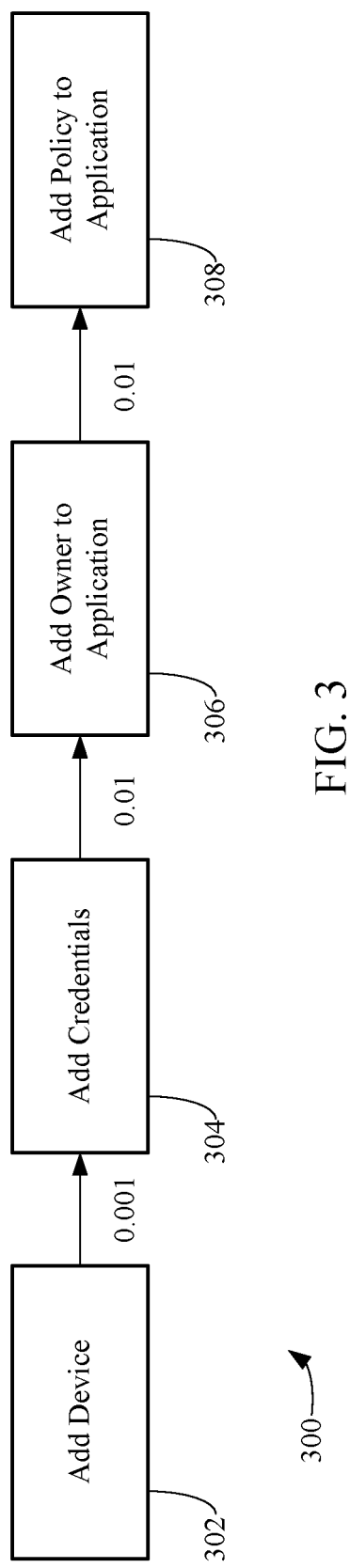
FIG. 3 depicts a flow diagram illustrating a sequence of actions performed with respect to a particular workload identity in accordance with an example embodiment.

Turning also now to FIG. 3, a flow diagram is depicted illustrating a sequence 300 of actions, exemplarily including an action 302, an action 304, an action 306, and an action 308 performed with respect to a particular workload identity in accordance with an example embodiment. As shown in FIG. 3, for action 302, action 304, action 306, and action 308, action 304 occurs after action 302, action 306 occurs after action 304, and action 308 occurs after action 306. It is noted that a sequence may comprise any number of actions and that four actions are shown for the sake of brevity and illustrative clarity. FIG. 3 and sequence 300 may be described with respect to FIGS. 1 and 2.

As shown in FIG. 3, action 302 corresponds to an action in which a device (e.g., a smart phone, a laptop, a desktop, etc.) has been added for a particular workload identity. Action 304 corresponds to an action in which user credentials are added for the workload identity. Action 306 corresponds to an action in which an application owner has been added to an application associated with the workload identity. Action 308 corresponds to an action in which a policy (e.g., an access policy, a security policy, etc.) has been added to an application associated with the workload identity.

Action model 206 may analyze action 302 and action 304 and generate a probability value indicative of the probability (or likelihood) that action 304 occurs after action 302 given that action 302 was the preceding action. As shown in FIG. 3, action model 206 generates a probability value of 0.001 with respect to action 302 and action 304, where lower the probability value, the less likely that a particular action should have occurred after another particular action. In this particular example, adding credentials after adding a device is not typical for a workload identity, and a low probability value is generated accordingly.

Action model 206 then analyzes action 304 and action 306 and generates a probability value indicative of the probability (or likelihood) that action 306 occurs after action 304 (and/or action 302) given that action 304 (and/or action 302) were the preceding action(s). As shown in FIG. 3, action model 206 generates a probability value of 0.01 with respect to action 306 and action 304.

Action model 206 then analyzes action 306 and action 308 and generates a probability value indicative of the probability (or likelihood) that action 308 occurs after action 306 (and/or action 302 and/or action 304) given that action 306 (and/or action 302 and/or action 304) were the preceding action(s). As shown in FIG. 3, action model 206 generates a probability value of 0.01 with respect to action 308 and action 306.

After generating all the probabilities for a particular sequence of actions (e.g., sequence 300), action model 206 may aggregate the probabilities to generate an aggregated representation of anomaly score 212, which may be provided to score combiner 208. Action model 206 may aggregate the probabilities in accordance with Equation 1, which is provided below:

$$\text{Aggregated Anomaly Score} = -\Sigma_i \log(\text{Prob}_i)/n \quad \text{(Equation 1)}$$

where i represents a given action (e.g., action 302, action 304, action 306, or action 308) and n represents the total number of actions in the sequence (e.g., sequence 300). In the example shown in FIG. 3, n is equal to 4, and the resulting aggregated anomaly score is 1.75.

Score combiner 208 may be configured to combine the aggregated anomaly score 212 with an authentication risk score 214 provided by authentication assessment engine 220 to generate a combined score 216. As described above with reference to FIG. 2, authentication risk score 214 may indicate a probability of whether user credentials associated with a user identity being analyzed were compromised at the time of authentication. In this way, identity protection engine 218 considers operations that occurred both during authentication and post-authentication (while the user was authenticated) to determine whether anomalous behavior is occurring or has occurred with respect to a particular user identity. In accordance with an embodiment, score combiner 208 may add anomaly score 212 (as aggregated) with authentication risk score 214 to generate combined score 216. Combined score 216 is provided to anomalous behavior determiner 210.

Anomalous behavior determiner 210 may be configured to determine whether combined score 216 meets a threshold condition. If the threshold condition is met, then anomalous behavior determiner 210 may determine that anomalous behavior has occurred with respect to the user identity being analyzed. If the threshold condition is not met, then anomalous behavior determiner 210 may determine that anomalous behavior has not occurred with respect to the user identity being analyzed.

In an embodiment, the threshold condition may be a predetermined value. In such an embodiment, anomalous behavior determiner 210 may be configured in one of many ways to determine that the threshold condition has been met. For instance, anomalous behavior determiner 210 may configured to determine that the threshold condition has been met if the combine score 216 is less than, less than or equal to, greater than or equal to, or greater than the predetermined value, and may include upward or downward crossings/meetings of threshold values.

In response to determining that anomalous behavior has occurred with respect to the workload identity, anomalous behavior determiner 210 may initiate, recommend, and/or cause a mitigation or remedial action to be performed that mitigates or remediates the anomalous behavior. For example, anomalous behavior determiner 210 may issue a notification 222 (e.g., to an administrator, customer, tenant, etc.) that indicates anomalous behavior has been detected, provides a description of the anomalous behavior (e.g., by specifying the actions in the sequence of actions determined to be anomalous, specifying the IP address(es) from which the actions initiated, times at which the actions occurred, etc.), cause the user identity to be removed from an identity service (e.g., identity service 128, as described above with reference to FIG. 1), cause access to a resource (e.g., an application, a service, a data object, etc.) that was previously-accessible by the user identity to be restricted for the user identity. The notification may comprise a short messaging service (SMS) message, a telephone call, an e-mail, a notification that is presented via an incident management service, a security tool (e.g., Microsoft® Defender for Cloud™ published by Microsoft® Corp, Microsoft® Sentinel™ published by Microsoft® Corp., etc.) configured to display security risks, the anomaly score, and/or enable a user to harden resources, etc. Anomalous behavior determiner 210 may cause a user identity and/or a workload identity to be removed from the identity service by sending a command 224 to identity service that causes the identity service to remove the user identity and/or the workload identity therefrom. Anomalous behavior determiner 210 may cause access to a resource to be restricted (e.g., by limiting or preventing access) for the user identity and/or the workload identity by sending command 224 to the identity service that causes the identity service to update access and/or permission settings for the user identity and/or the workload identity with regards to the resource. Alternatively, the security tool that receives notification 222 may provide one or more options that enable a user such as an administrator, customer, tenant, etc., to initiate any of the mitigation actions described herein.

In the context of workload identities specifically, the remedial action performed may include, without limitation, removing and replacing one or more active credentials of the workload identity in identity service 128, auditing administrator access to the workload identity, locking or restricting a permission to a web API of the workload identity, etc. One or more remedial actions for workload identities may be performed or caused to be performed, e.g., via command 224) by and/or in identity service 128, may be performed at a compute node in a tenancy by a tenant, may be automatically performed in whole or in part by anomalous behavior determiner 210, and/or the like, in various aspects contemplated herein. In some aspects, the remedial action may comprise the providing of a notification(s) such as notification 222 to an administrator, customer, tenant, etc., with recommendations, information, and/or the like, as noted here.

The foregoing embodiments enable detection of a variety of different post-authentication anomalous behavior. For instance, in the context of user identities, detection may include whether certain users (e.g., privileged users) changed federation settings or domains, whether an administrator consented to permissions on behalf of a tenant of a cloud-based platform, whether an administrator consented to certain permission grants, whether a scope (e.g., a regional scope) of an administrative unit of identity service 128 of FIG. 1 (that restricts permissions in a role to a certain portion of an organization) is changed, whether a user identity is viewing other user or group attributes (such as permission grants) or updating credentials, whether a user identity is viewing sensitive documents or downloading certain files or a large number of files, whether a user identity is viewing downloading, exporting identity related information, whether a user identity is creating new user accounts, groups, or cloud-based subscriptions, whether a user identity is changing user or group attributes or permissions, whether a previously-dormant account performs mass downloads, reads configuration settings, etc., whether a previously-dormant account is assigned new attributes or provided access to certain resources, whether the same user identity is enabling dormant users, whether an administrator resets a user account that is logged in by a user identity from the same location, whether an admin elevates privileges of other user accounts beyond their own privileges, resets or updates the password of such user accounts, creates new file paths or access command line interfaces, changes file extensions, etc., and/or whether such user accounts perform mass downloads, read user configuration settings, etc., whether a user identity changes data protection settings, whether a user identity deletes large files, whether a user identity retriggers guest invitation emails, whether a user identity restores deleted administrative accounts, whether a user identity downgrades or changes multi-factor authentication settings for a plurality of user accounts, whether a user identity changes a conditional access policy to report only to specific users, whether a user identity engages in mass device enrollment (or removal) for a new account, whether a user identity changes IP configuration settings, mail forwarding rules, creates/changes certain application programming interfaces, etc., and/or any combination of such behavior.

Additionally, in the context of workload identities, detection may include actions performed on workload identities by other workload identities and/or by user identities with respect to identity service 128 after the user identities have been authenticated by and remain authenticated with identity service 128, as well as actions subsequently taken by workload identities. Such actions include, but are not limited to, credentials being added by a medium- or high-risk user, credentials being added to a workload identity that previously had zero credentials, an appearance of uncommon combination of credentials (e.g., password credentials added to a workload identity that previously only had certificates or symmetric keys, or vice versa), a deviation in an access pattern of the workload identity (e.g., accesses to a new application inconsistent with previous access patterns, high activity and exhibition of new access patterns when previously inactive, performing application consent on behalf of another identity and exhibiting new access patterns, etc.), a creation of a new workload identity by the workload identity, a self-signed certificate(s) being added to a workload identity that previously only had certificates from the same certificate authority (or if the actor uses a certificate authority via an anomalous issuer), a user adding credentials to a workload identity after making a relatively low amount of other management operations in the past for other applications, a user adding credentials to a workload identity that previously only had credentials added by another user(s), credentials being added to a workload identity that include the workload identity in a new group or in a new directory role, an elevation of a privilege(s) of the workload identity, credentials being added via a different source application than is normally used in a tenancy (e.g., if the organization typically uses an application to manage credentials, then a PowerShell is used), credentials being added with a significantly different expiry/lifetime compared to the other credentials in the tenancy, multiple credentials (especially of different types) being simultaneously used for token acquisition at the same time by the same application, but from different IPs, (but consistent), credentials being added that key off of different API calls compared to the other credentials in the tenancy, credentials being added to a workload identity of a first tenant which is backed by a multi-tenant application registered in a second tenant (e.g., when the multi-tenant application rarely has credentials added "locally," as with a workload identity), credentials being used to request tokens to a resource API from a workload identity that no other credentials for that workload identity has ever requested tokens for (e.g., when follow-up API calls are very different than previous API calls), and/or the like.

Accordingly, the detection of anomalous post-authentication behavior with respect to a user identity may be implemented in many ways.

Figure 4:
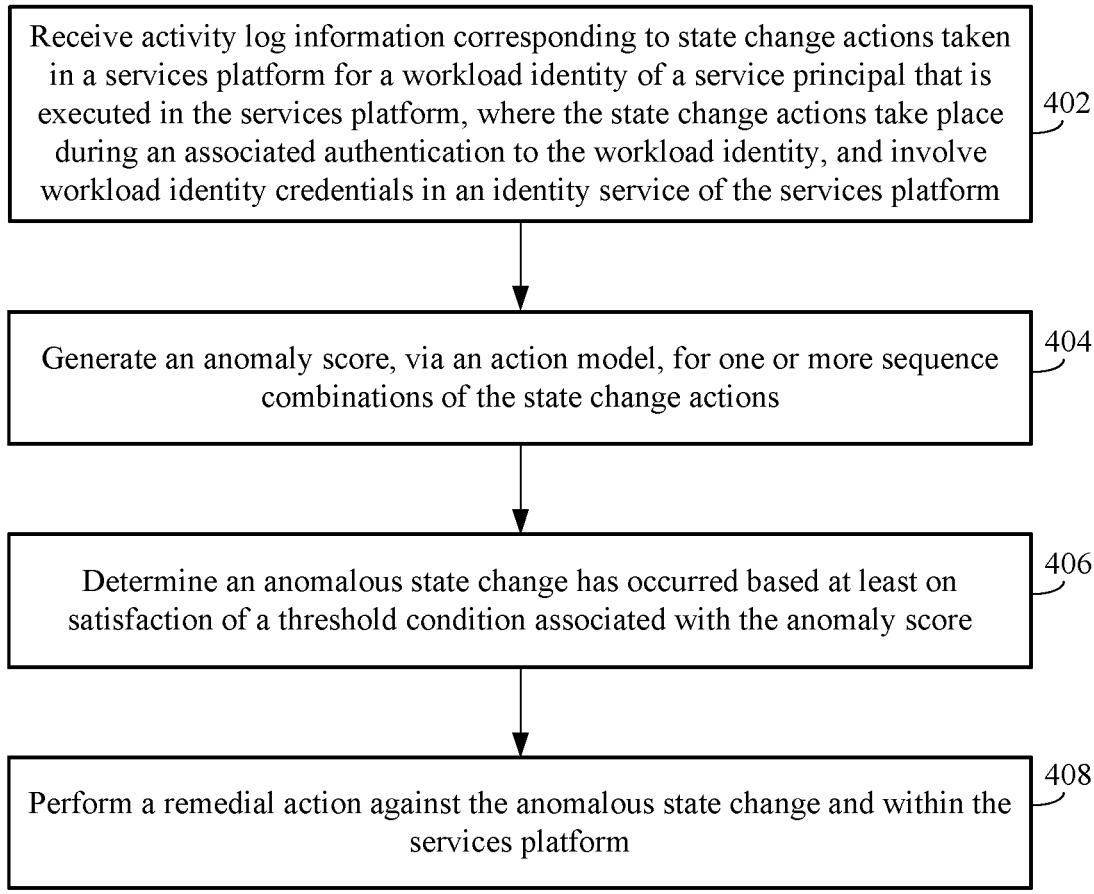
FIG. 4 shows a flowchart of a method for detecting anomalous post-authentication behavior with respect to a workload identity in accordance with an example embodiment.

For example, referring to FIG. 4, a flowchart 400 is shown of a method for detecting anomalous post-authentication behavior with respect to a workload identity in accordance with an example embodiment. In an embodiment, flowchart 400 may be implemented by identity protection engine 218 of system 200 shown in FIG. 2, although the method is not limited to that implementation. Accordingly, flowchart 400 will be exemplarily described with continued reference to FIG. 2. Other structural and operational embodiments will be apparent to persons skilled in the relevant art(s) based on the discussion regarding flowchart 400 and system 200 of FIG. 2.

Flowchart 400 begins with step 402. In step 402, activity log information is received corresponding to state change actions taken in a services platform for a workload identity of a service principal that is executed in the services platform, where the state change actions take place during an associated authentication to the workload identity, and involve workload identity credentials in an identity service of the services platform. For example, with reference to FIG. 2, log retriever 202 is configured to receive activity log information corresponding to state change actions taken in a services platform for a workload identity while a user was authenticated, e.g., a subset of audit log(s) 234 (specifying actions, e.g., a first plurality of actions, that were performed with respect to a user identity of a platform-based identity service). The subset (e.g., audit log(s) 236) may be provided to featurizer 204. As described above, featurizer 204 generates feature vector(s) 238 based on the data included in audit log(s) 236 and provides feature vector(s) 238 to action model 206.

In accordance with one or more embodiments, the services platform is cloud-based platform that hosts various types of applications, services, data, other resources, etc., and the identity service of the services platform is identity service 128, e.g., a directory, as described above with reference to FIG. 1. In accordance with one or more other embodiments, the platform may be an enterprise-based platform, an on-premise device, or other types of platforms.

In step 404, an anomaly score is generated, via an action model, for one or more sequence combinations of the state change actions. For example, with reference to FIG. 2, action model 206 generates anomaly score 212, which may be aggregated scores as noted above, and which indicates a probability whether a particular sequence (e.g., sequence 300, as shown in FIG. 3) of the actions noted in the activity log information is indicative of anomalous behavior/state change(s). Action model 206 may generate anomaly score 212 based on feature vector(s) 238. Additional details regarding generating the anomaly score are provided below with reference to FIG. 6.

In step 406, it is determined whether an anomalous state change has occurred based at least on satisfaction of a threshold condition associated with the anomaly score. For example, with reference to FIG. 2, anomalous behavior determiner 210 determines that anomalous behavior/state change has occurred based at least on anomaly score 212 satisfying a threshold condition, such as having a value with a relative relationship to a threshold value. Additional details with regards to determining that anomalous behavior/state change has occurred based at least on anomaly score 212 is described below with reference to FIG. 5.

In step 408, a remedial action is performed against the anomalous state change and within the services platform. For example, with reference to FIG. 2, anomalous behavior determiner 210 performs or causes to be performed a mitigation action in the services platform that mitigates the anomalous behavior based on determining that the anomalous behavior/state change has occurred.

In accordance with one or more embodiments, performing, or causing the mitigation action to be performed, comprises at least one of providing a notification that indicates that the anomalous behavior was detected, causing the user identity to be removed from the platform-based identity service, or causing access to a resource that was previously-accessible by the user identity to be restricted for the user identity. For example, with reference to FIG. 2, anomalous behavior determiner 210 may provide a notification 222 that indicates that the anomalous behavior was detected. In another example, anomalous behavior determiner 210 may provide command 224 (e.g., to identity service 128, as shown in FIG. 1) that instructs identity service 128 to remove the user identity from identity service or that instructs identity service 128 to restrict a resource that was previously-accessible by the user identity. In embodiments, anomalous behavior determiner 210 and/or identity service 128 may perform removing and replacing one or more active credentials of the workload identity, auditing administrator access to the workload identity, locking or restricting a permission to a web API of the workload identity, etc.

Figure 5:
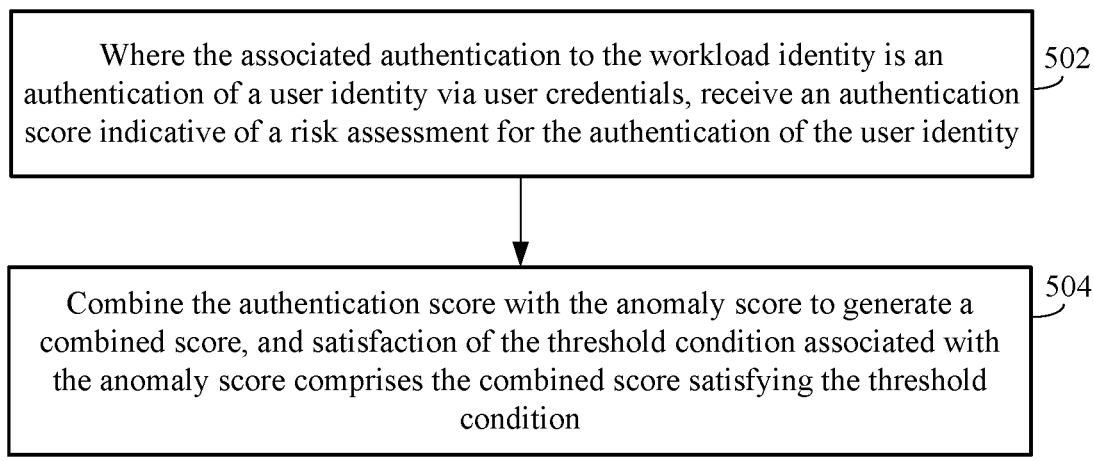
FIG. 5 shows a flowchart of a method for determining that an anomalous behavior has occurred based at least on the anomaly score in accordance with an example embodiment.

FIG. 5 shows a flowchart 500 of a method for determining that an anomalous behavior has occurred based at least on the anomaly score in accordance with an example embodiment. In an embodiment, flowchart 500 may be implemented by identity protection engine 218 of system 200 shown in FIG. 2, although the method is not limited to that implementation. Accordingly, flowchart 500 may be an embodiment of flowchart 400 in FIG. 4, and will be described with continued reference to FIG. 2. Other structural and operational embodiments will be apparent to persons skilled in the relevant art(s) based on the discussion regarding flowchart 500 and system 200 of FIG. 2.

Flowchart 500 begins with step 502. In step 502, the associated authentication to the workload identity is an authentication of a user identity via user credentials, and an authentication score indicative of a risk assessment for the authentication of the user identity is received. For example, with reference to FIG. 2, score combiner 208 is configured to receive authentication risk score 214 (e.g., the authentication score) indicating a probability whether user credentials utilized to authenticate the user with the platform-based identity service (e.g., identity service 128, as shown in FIG. 1) were compromised at the time of authentication.

In step 504, the authentication risk score and anomaly score are combined to generate a combined score. For example, with reference to FIG. 2, score combiner 208 combines (e.g., adds) authentication risk score 214 and aggregated anomaly score 212 to generate a combined score 216.

In step 506, the authentication score is combined with the anomaly score to generate a combined score, and satisfaction of the threshold condition associated with the anomaly score comprises the combined score satisfying the threshold condition. For example, with reference to FIG. 2, anomalous behavior determiner 210 determines that the anomalous behavior has occurred based on combined score 216 meeting a threshold condition, as described herein.

Figure 6:
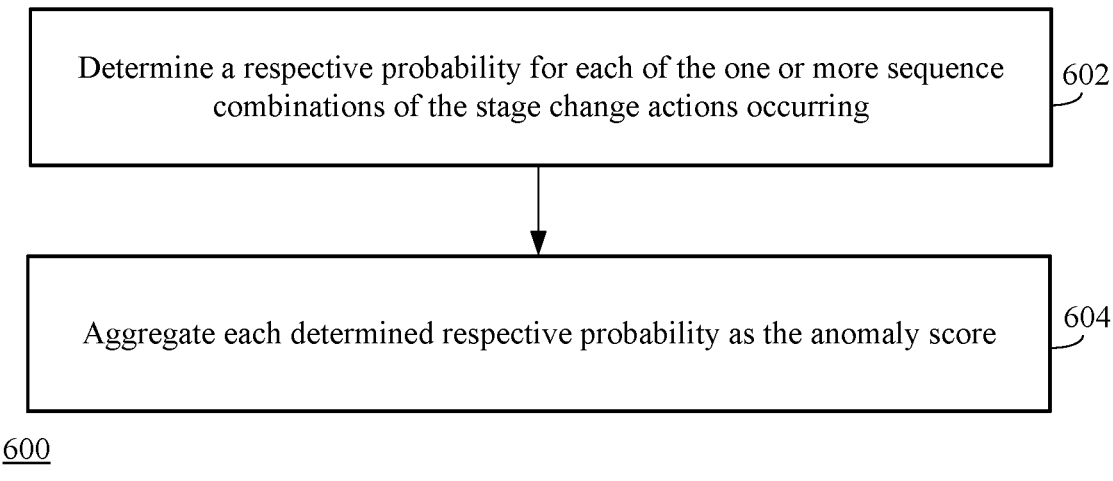
FIG. 6 shows a flowchart of a method for determining an anomaly score in accordance with an example embodiment.

FIG. 6 shows a flowchart 600 of a method for determining an anomaly score in accordance with an example embodiment. In an embodiment, flowchart 600 may be implemented by identity protection engine 218 of system 200 shown in FIG. 2, although the method is not limited to that implementation. Accordingly, flowchart 600 may be an embodiment of flowchart 400 in FIG. 4, will be described with continued reference to FIG. 2. Other structural and operational embodiments will be apparent to persons skilled in the relevant art(s) based on the discussion regarding flowchart 600 below and system 200 of FIG. 2 above.

Flowchart 600 begins with step 602. In step 602, a respective probability is determined for each of the one or more sequence combinations of the state change actions occurring. For example, with reference to FIG. 2, for each action in the particular sequence of actions specified via feature vector(s) 238, action model 206 determines a respective probability that the action in the particular sequence of actions normally occurs (e.g., when no anomalous behavior is present) after one or more other actions from the particular sequence of actions. For instance, with reference to FIG. 3, action model 206 determines a first probability value (0.001) that indicates a probability that action 304 normally occurs after action 302, determines a second probability value (0.01) that indicates a probability that action 306 normally occurs after action 304, and determines a third probability value (0.01) that indicates a probability that action 308 normally occurs after action 306.

In step 604, each determined respective probability is aggregated as the anomaly score. For example, with reference to FIG. 2, action model 206 may aggregate the respective probabilities determined for the sequence combinations of actions into an aggregated probability. That is, anomaly score 212 may be aggregated based on the aggregated probabilities together (e.g., aggregated anomaly score 212 is equal to the aggregated probability). Action model 206 may determine anomaly score 212 as aggregated in accordance with Equation 1, as described above.

Figure 7:
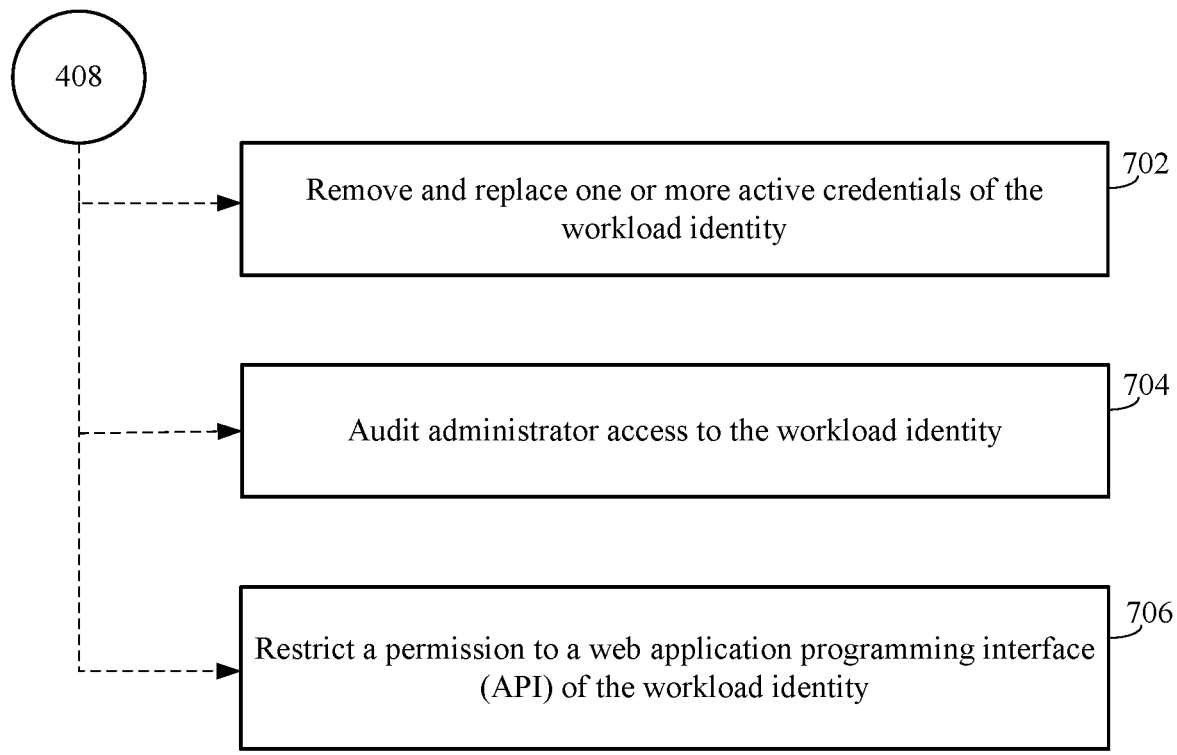
FIG. 7 shows a flowchart of a method for training an action model in accordance with an example embodiment.

Turning now to FIG. 7, a flowchart 700 is shown of a method for performing a remedial action against an anomalous state change within a services platform, in accordance with an example embodiment. In an embodiment, flowchart 700 may be implemented by or in conjunction with identity protection engine 218 of system 200 shown in FIG. 2, although the method is not limited to that implementation. Accordingly, flowchart 700 may be an embodiment of flowchart 400 in FIG. 4, e.g., in particular of step 408, and will be described with continued reference to FIG. 2. Other structural and operational embodiments will be apparent to persons skilled in the relevant art(s) based on the discussion regarding flowchart 700 below and system 200 of FIG. 2 above.

As noted, flowchart 700 may be an embodiment of step 408 in flowchart 400 of FIG. 4. In embodiments, performing the remedial action in step 408 includes at least one of the steps of flowchart 700.

In step 702, one or more active credentials of the workload identity are removed and replaced. For instance, credentials that are added or changed for a workload identity that allow unauthorized accesses or that allow lateral movement through a computing environment may be removed and replaced with proper credentials. This removal and replacement may be performed in whole or in part by identity protection engine 218 of FIG. 2 and may alter the workload identity credentials at identity service 128, in some embodiments.

In step 704, administrator access to the workload identity is audited. For example, user identities of administrators for an application, service principal, etc., may be compromised to allow for the infiltration and exfiltration actions described herein. Similarly, credentials may be added to a workload identity that allow for a user to perform administrator consent actions. The auditing may be performed in whole or in part by identity protection engine 218 of FIG. 2 and may identify and/or report compromised administrator credentials, in some embodiments.

In step 706, a permission to a web API of the workload identity is restricted. For instance, it may be determined that identity actions/behaviors have altered the reply URI (uniform resource identifier) of a web API call utilized by the workload identity, which changes the "state" of the workload identity. This alteration may be identified as taking place subsequent to a state change involving credentials of the workload identity. In either of such cases, the web API permissions for the workload identity may be restricted. The restricting may be performed in whole or in part by identity protection engine 218 of FIG. 2 and may alter the workload identity credentials at identity service 128, in some embodiments.

Figure 8:
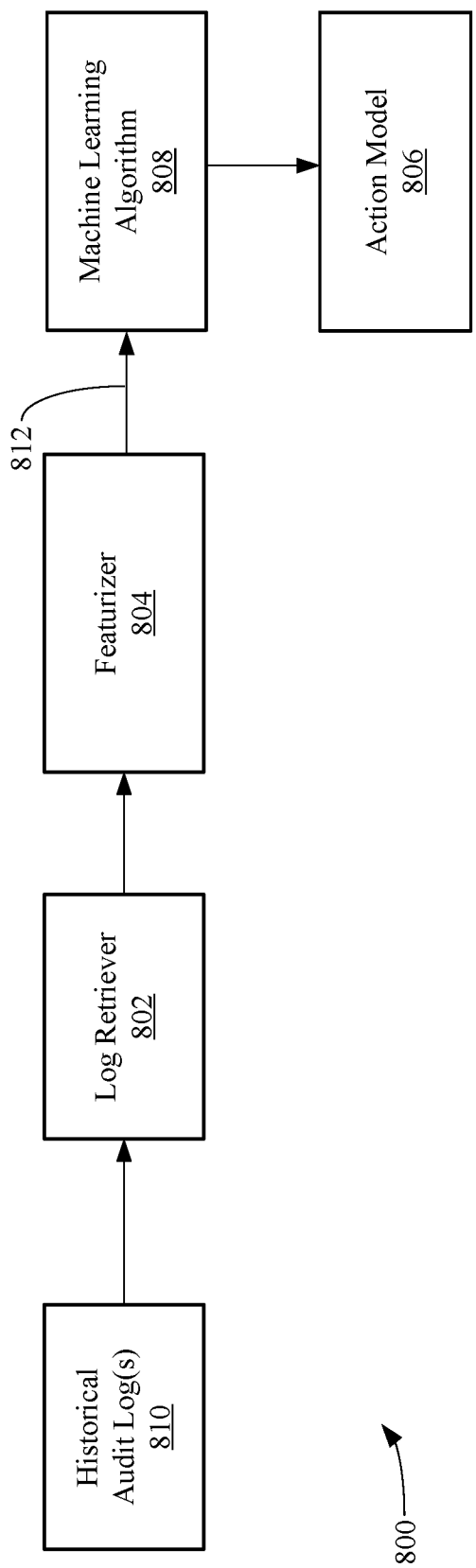
FIG. 8 depicts a block diagram of a system for training an action model in accordance with an example embodiment.

FIG. 8 will now be described. A method for training an action model is also contemplated herein for an example embodiment. In an embodiment, such a method may be implemented by a system 800 as shown in FIG. 8, although the method is not limited to that implementation. FIG. 8 depicts a block diagram of a system 800 for training an action model 806 for anomaly prediction based on actions taken, in accordance with an example embodiment. As shown in FIG. 8, system 800 may comprise a log retriever 802, a featurizer 804, a machine learning algorithm 808, action model 806, and one or more historical audit log(s) 810. Log retriever 802, featurizer 804, and action model 806 are examples of log retriever 202, featurizer 204, and action model 206, as respectively described above with reference to FIG. 2. It is noted that one or more of log retriever 802, featurizer 804, machine learning algorithm 808, and/or action model 806 may be implemented in an identity protection engine, such as identity protection engine 218, as described above with reference to FIG. 2. Other structural and operational embodiments will be apparent to persons skilled in the relevant art(s) based on the discussion regarding the method for training and system 800 of FIG. 8.

The method for training may include a plurality of features associated with logs specifying a second plurality of actions performed with respect to a plurality of user identities and/or workload identities of the platform-based identity service being determined. For example, with reference with FIG. 8, log retriever 802 is configured to retrieve one or more historical audit logs 810. Historical audit log(s) 810 may be stored in a storage node (e.g., storage node 110B, as shown in FIG. 1). Historical audit log(s) 810 represent audit log(s) (and may be similar to audit log(s) 234, as described above with reference to FIG. 2) that were previously-generated for a plurality of user identities and/or workload identities over the course of several days, weeks, months, etc. For each action, audit log(s) 810 may specify an identifier for the action, a time stamp indicating a time at which the action occurred, a network address from which the action was initiated, a user identity and/or workload identity that initiated and/or performed the action, etc. Each audit log of historical audit log(s) 810 may store a day's worth of actions. However, the embodiments described herein are not so limited, and each audit log of historical audit log(s) 810 may store multiple or fractional days' worth of actions. Historical audit log(s) 810 may be generated by a monitor, such as monitor 132, as described above with reference to FIG. 1. Log retriever 802 provides historical audit log(s) 810 to featurizer 804.

The method for training may continue with the plurality of features being provided as training data to a machine learning algorithm. In embodiments, the machine learning algorithm is configured to determine, for the one or more sequence combinations of the state change actions that occurred, a probability that a first action from the sequence of actions occurs after a second action from the sequence of actions. For example, with reference to FIG. 8, featurizer 804 may be configured to extract data from historical audit log(s) 810. The data includes, but is not limited to, an identifier and/or a type for each action specified by audit log(s) 236, a time stamp indicating a time at which each action occurred, a network address from which each action was initiated, a user identity and/or workload identity that initiated and/or performed the action, etc. Featurizer 804 may be also configured to generate one or more feature vectors 812 based on the data extracted from historical audit log(s) 810, which are provided to machine learning algorithm 808. Feature vector(s) 812 generated by featurizer 804 may take any form, such as a numerical, visual and/or textual representation, or may comprise any other form suitable for representing historical audit log(s) 810. In an embodiment, feature vector(s) 812 may include features such as keywords, a total number of words, and/or any other distinguishing aspects relating to historical audit log(s) 810 that may be extracted therefrom. Featurizer 804 may operate in a number of ways to featurize, or generate feature vector(s) 812 for, a given audit log of audit log(s) 236. For example and without limitation, featurizer 804 may featurize a given audit log of historical audit log(s) 810 through time series analysis, keyword featurization, semantic-based featurization, digit count featurization, and/or n-gram-TFIDF featurization.

Machine learning algorithm 808 may be configured to determine relationships between actions performed by user identities and/or workload identities and/or user identities on workload identities (e.g., the likelihood that a particular action occurs after another action for a user identity/workload identity that does not exhibit anomalous behavior, the likelihood that a particular action occurs after another action for a user identity/workload identity that exhibits anomalous behavior, etc.) based on an analysis of feature vector(s) 812. Machine learning algorithm 808 may utilize an n-gram (e.g., 2-gram, 3-gram, etc.) probability-based technique to determine the probabilities of transitions between different actions in any given sequence of actions specified via feature vector(s) 812. Machine learning algorithm 808 may be an unsupervised machine learning algorithm or a neural network-based machine learning algorithm (e.g., a recurrent neural network (RNN)-based machine learning algorithm, such as, but not limited to a long short-term memory (LSTM)-based machine learning algorithm). Utilizing the foregoing techniques, machine learning algorithm 808 generates action model 806, which may be utilized to generate an anomaly score, as described above with reference to FIG. 2.

III. Example Computer System Implementation

The systems and methods described above in reference to FIGS. 1-8, may be implemented in hardware, or hardware combined with one or both of software and/or firmware. For example, system 900 may be used to implement any of nodes 108A-108N, nodes 112A-112N, and/or nodes 114A-114N, storage node(s) 110A-110N, identity protection engine 118, monitor 132, authentication assessment engine 120, and identity service 128 of FIG. 1, identity protection engine 218, authentication assessment engine 220, log retriever 202, featurizer 204, action model 206, score combiner 208, and/or anomalous behavior determiner 210 of FIG. 2, log retriever 802, featurizer 804, machine learning algorithm 808, and/or action model 806 of FIG. 8, and/or any of the components respectively described therein, and flowchart 400, flowchart 500, flowchart 600, and/or flowchart 700 may be each implemented as computer program code/instructions configured to be executed in one or more processors and stored in a computer readable storage medium. Alternatively, any of nodes 108A-108N, nodes 112A-112N, and/or nodes 114A-114N, storage node(s) 110A-110N, identity protection engine 118, monitor 132, authentication assessment engine 120, and identity service 128 of FIG. 1, identity protection engine 218, authentication assessment engine 220, log retriever 202, featurizer 204, action model 206, score combiner 208, and/or anomalous behavior determiner 210 of FIG. 2, log retriever 802, featurizer 804, machine learning algorithm 808, and/or action model 806 of FIG. 8, and/or any of the components respectively described therein, and flowchart 400, flowchart 500, flowchart 600, and/or flowchart 700 may be implemented as hardware logic/electrical circuitry. In an embodiment, any of nodes 108A-108N, nodes 112A-112N, and/or nodes 114A-114N, storage node(s) 110A-110N, identity protection engine 118, monitor 132, authentication assessment engine 120, and identity service 128 of FIG. 1, identity protection engine 218, authentication assessment engine 220, log retriever 202, featurizer 204, action model 206, score combiner 208, and/or anomalous behavior determiner 210 of FIG. 2, log retriever 802, featurizer 804, machine learning algorithm 808, and/or action model 806 of FIG. 8, and/or any of the components respectively described therein, and flowchart 400, flowchart 500, flowchart 600, and/or flowchart 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
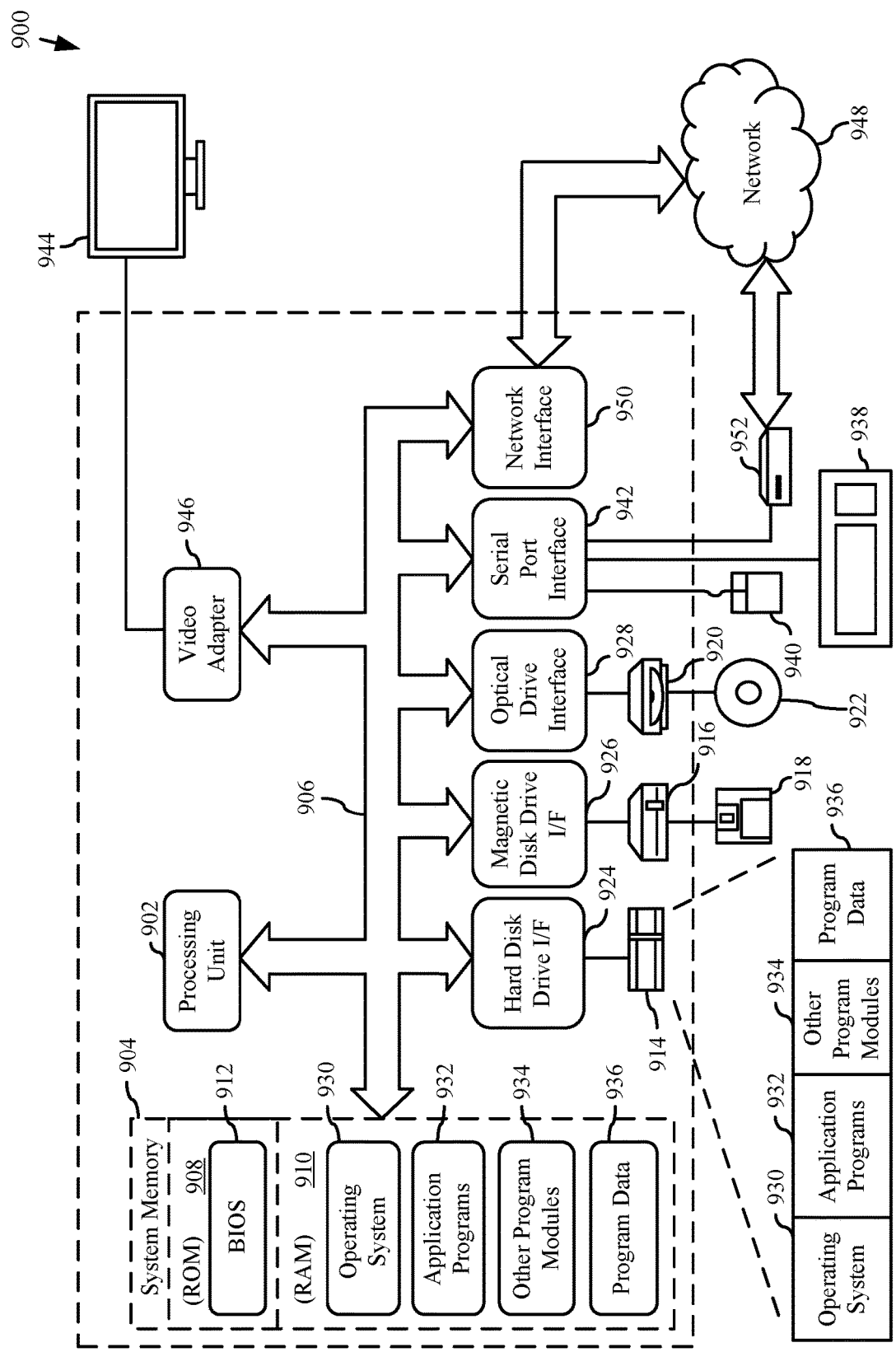
FIG. 9 is a block diagram of an example processor-based computer system that may be used to implement various embodiments.

FIG. 9 depicts an exemplary implementation of a computing device 900 in which embodiments may be implemented, including any of nodes 108A-108N, nodes 112A-112N, and/or nodes 114A-114N, storage node(s) 110A-110N, identity protection engine 118, monitor 132, authentication assessment engine 120, and identity service 128 of FIG. 1, identity protection engine 218, authentication assessment engine 220, log retriever 202, featurizer 204, action model 206, score combiner 208, and/or anomalous behavior determiner 210 of FIG. 2, log retriever 802, featurizer 804, machine learning algorithm 808, and/or action model 806 of FIG. 8, and/or any of the components respectively described therein, and flowchart 400, flowchart 500, flowchart 600, and/or flowchart 700. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems described above, including the embodiments described above with reference to FIGS. 1-8.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in, computing device 900. Display screen 944 may display information, as well as being a user interface for receiving user commands and/or other information (e.g., by touch, finger gestures, a virtual keyboard, by providing a tap input (where a user lightly presses and quickly releases display screen 944), by providing a "touch-and-hold" input (where a user touches and holds his finger (or touch instrument) on display screen 944 for a predetermined period of time), by providing touch input that exceeds a predetermined pressure threshold, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," "computer-readable storage medium," and/or the like are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable media, computer-readable storage media, etc., are distinguished from and non-overlapping with communication media and propagating signals (do not include communication media and propagating signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

As described, systems and devices embodying the techniques herein may be configured and enabled in various ways to perform their respective functions for context-aware security policies and incident identification via automated cloud graph building with security overlays. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

Prior solutions fail to address post-authentication risk for workload identities, much less doing so in the context of user identities. Thus, prior solutions also fail to adequately address lateral escalation of application privileges to hide and further the actions of bad actors. In contrast, the embodiments herein utilize post-authentication risk evaluations for workload identities based on actions taken in association with the workload identities and modeling thereof, that enables a greater understanding of computing system credential usage and that improves security policy implementation, as well as security incident identification and remediation, in an extensible way. These and other improvements described herein for detecting anomalous post-authentication behavior with respect to a workload identity were previously not available for software-based platforms and networks, much less for the specific system implementations, organizations, and architectures in the embodiments described herein.

The additional examples and embodiments described in this Section may be applicable to examples disclosed in any other Section or subsection of this disclosure.

Embodiments in this description provide for systems, devices, and methods for detecting anomalous post-authentication behavior with respect to a workload identity. For instance, such a system is described herein. The system includes at least one memory that stores program code, and a processing system, comprising one or more processors, configured to receive the program code from the memory and, in response to at least receiving the program code, to perform operations. The operations include to receive activity log information corresponding to state change actions taken in a services platform for a workload identity of a service principal that is executed in the services platform, where the state change actions take place during an associated authentication to the workload identity, and involve workload identity credentials in an identity service of the services platform: generate an anomaly score, via an action model, for one or more sequence combinations of the state change actions: determine an anomalous state change has occurred based at least on satisfaction of a threshold condition associated with the anomaly score; and perform a remedial action against the anomalous state change and within the services platform.

In an embodiment of the computing system, the associated authentication to the workload identity is an authentication of a user identity via user credentials, and the processing system, in response to at least receiving the program code, is configured to receive an authentication score indicative of a risk assessment for the authentication of the user identity; and combine the authentication score with the anomaly score to generate a combined score, where satisfaction of the threshold condition associated with the anomaly score comprises the combined score satisfying the threshold condition.

In an embodiment of the computing system, the action model is a machine learning model that is trained based at least on first features of prior state change actions associated with the workload identity and second features of prior authentication scores associated with at least the user identity to determine probabilities of the prior state change actions occurring in their respective prior sequence combinations, and the machine learning model is an unsupervised machine learning model or a neural network-based machine learning model.

In an embodiment of the computing system, the first features comprise at least one of a respective identifier for each of the prior state change actions associated with the workload identity: a respective time stamp indicating a time at which a respective one of the prior state change actions associated with the workload identity occurred: or a respective network address from which a respective one of the prior state change actions associated with the workload identity was initiated.

In an embodiment of the computing system, to perform the remedial action includes at least one of: to remove and replace one or more active credentials of the workload identity: to audit administrator access to the workload identity: or to restrict a permission to a web application programming interface (API) of the workload identity.

In an embodiment of the computing system, to generate the anomaly score comprises to determine a respective probability for each of the one or more sequence combinations of the state change actions occurring, and to aggregate each determined respective probability as the anomaly score.

In an embodiment of the computing system, the anomaly score, generated for the one or more sequence combinations of the state change actions, indicates the anomalous state change as at least one of: a deviation in an access pattern of the workload identity: a creation of a new workload identity by the workload identity: a self-signed certificate being added to the workload identity, the workload identity previously having only one or more certificates from a single certificate authority: a user adding at least one first credential to the workload identity, the workload identity previously having any credentials added only by other users: a second credential with an atypical validity lifetime being added to the workload identity: a third credential being added to the workload identity that includes the workload identity in a new group, or that includes the workload identity in a new directory role, or that elevates privileges of the workload identity: or the workload identity utilizing a plurality of different credentials at least partially concurrently from at least two different network addresses to acquire one or more tokens.

A method performed by a computing system is also described. The method includes receiving activity log information corresponding to state change actions taken in a services platform for a workload identity of a service principal that is executed in the services platform, the state change actions taking place during an associated authentication to the workload identity, and involving workload identity credentials in an identity service of the services platform: generating an anomaly score, via an action model, for one or more sequence combinations of the state change actions: determining an anomalous state change has occurred based at least on satisfaction of a threshold condition associated with the anomaly score; and performing a remedial action against the anomalous state change and within the services platform.

In an embodiment of the method, the associated authentication to the workload identity is an authentication of a user identity via user credentials, and the method further includes: receiving an authentication score indicative of a risk assessment for the authentication of the user identity; and combining the authentication score with the anomaly score to generate a combined score: where satisfaction of the threshold condition associated with the anomaly score comprises the combined score satisfying the threshold condition.

In an embodiment of the method, the action model is a machine learning model that is trained based at least on first features of prior state change actions associated with the workload identity and second features of prior authentication scores associated with at least the user identity to determine probabilities of the prior state change actions occurring in their respective prior sequence combinations; and the machine learning model is an unsupervised machine learning model or a neural network-based machine learning model.

In an embodiment of the method, the first features comprise at least one of: a respective identifier for each of the prior state change actions associated with the workload identity: a respective time stamp indicating a time at which a respective one of the prior state change actions associated with the workload identity occurred: or a respective network address from which a respective one of the prior state change actions associated with the workload identity was initiated.

In an embodiment of the method, the remedial action includes at least one of: removing and replacing one or more active credentials of the workload identity: auditing administrator access to the workload identity: or restricting a permission to a web application programming interface (API) of the workload identity.

In an embodiment of the method, generating the anomaly score includes: determining a respective probability for each of the one or more sequence combinations of the state change actions occurring; and aggregating each determined respective probability as the anomaly score.

In an embodiment of the method, the anomaly score, generated for the one or more sequence combinations of the state change actions, indicates the anomalous state change as at least one of: a deviation in an access pattern of the workload identity: a creation of a new workload identity by the workload identity: a self-signed certificate being added to the workload identity, the workload identity previously having only one or more certificates from a single certificate authority: a user adding at least one first credential to the workload identity, the workload identity previously having any credentials added only by other users; a second credential with an atypical validity lifetime being added to the workload identity; a third credential being added to the workload identity that includes the workload identity in a new group, or that includes the workload identity in a new directory role, or that elevates privileges of the workload identity: or the workload identity utilizing a plurality of different credentials at least partially concurrently from at least two different network addresses to acquire one or more tokens.

A computer-readable storage medium is also described. The computer-readable storage medium has program instructions recorded thereon that, when executed by at least one processor of a computing system, perform a method. The method includes receiving activity log information corresponding to state change actions taken in a services platform for a workload identity of a service principal that is executed in the services platform, the state change actions taking place during an associated authentication to the workload identity, and involving workload identity credentials in an identity service of the services platform: generating an anomaly score, via an action model, for one or more sequence combinations of the state change actions: determining an anomalous state change has occurred based at least on satisfaction of a threshold condition associated with the anomaly score; and performing a remedial action against the anomalous state change and within the services platform.

In an embodiment of the computer-readable storage medium, the associated authentication to the workload identity is an authentication of a user identity via user credentials. In the embodiment, the method further includes: receiving an authentication risk score indicating a probability whether user credentials utilized to authenticate the user with the platform-based identity service were compromised at the time of authentication; combining the authentication risk score and the anomaly score to generate a combined score; and determining that the anomalous behavior has occurred based on the combined score meeting a predetermined condition.

In an embodiment of the computer-readable storage medium, the action model is a machine learning model that is trained based at least on first features of prior state change actions associated with the workload identity and second features of prior authentication scores associated with at least the user identity to determine probabilities of the prior state change actions occurring in their respective prior sequence combinations; and the machine learning model is an unsupervised machine learning model or a neural network-based machine learning model.

In an embodiment of the computer-readable storage medium, the first features comprise at least one of: a respective identifier for each of the prior state change actions associated with the workload identity: a respective time stamp indicating a time at which a respective one of the prior state change actions associated with the workload identity occurred: or a respective network address from which a respective one of the prior state change actions associated with the workload identity was initiated.

In an embodiment of the computer-readable storage medium, the remedial action includes at least one of: removing and replacing one or more active credentials of the workload identity: auditing administrator access to the workload identity: or restricting a permission to a web application programming interface (API) of the workload identity.

In an embodiment of the computer-readable storage medium, generating the anomaly score includes determining a respective probability for each of the one or more sequence combinations of the state change actions occurring; and aggregating each determined respective probability as the anomaly score.

In an embodiment of the computer-readable storage medium, the anomaly score, generated for the one or more sequence combinations of the state change actions, indicates the anomalous state change as at least one of: a deviation in an access pattern of the workload identity: a creation of a new workload identity by the workload identity: a self-signed certificate being added to the workload identity, the workload identity previously having only one or more certificates from a single certificate authority: a user adding at least one first credential to the workload identity, the workload identity previously having any credentials added only by other users: a second credential with an atypical validity lifetime being added to the workload identity: a third credential being added to the workload identity that includes the workload identity in a new group, or that includes the workload identity in a new directory role, or that elevates privileges of the workload identity: or the workload identity utilizing a plurality of different credentials at least partially concurrently from at least two different network addresses to acquire one or more tokens.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A computing system, comprising:
   at least one memory that stores program code; and
   a processing system, comprising one or more processors, configured to receive the program code from the at least one memory and, in response to at least receiving the program code, to:
   receive activity log information corresponding to state change actions taken in a services platform for a workload identity of a service principal that is executed in the services platform, where the state change actions
      take place during an associated authentication to the workload identity, and
      involve workload identity credentials in an identity service of the services platform;
   generate, for state change actions in a sequence combination of state change actions, probability values indicative of a likelihood that a particular state change action in the sequence combination of state change actions occurs after a state change action in the sequence combination of state change actions immediately preceding the particular state change action;
   generate an anomaly score, via an action model, for the sequence combination of the state change actions by aggregating the probability values;
   determine an anomalous state change has occurred based at least on satisfaction of a threshold condition associated with the anomaly score; and
   perform a remedial action against the anomalous state change and within the services platform.

2. The computing system of claim 1, wherein the associated authentication to the workload identity is an authentication of a user identity via user credentials;
   wherein the processing system, in response to at least receiving the program code, is configured to:
      receive an authentication score indicative of a risk assessment for the authentication of the user identity; and
      combine the authentication score with the anomaly score to generate a combined score;
   wherein satisfaction of the threshold condition associated with the anomaly score comprises the combined score satisfying the threshold condition.

3. The computing system of claim 2, wherein the action model is a machine learning model that is trained based at least on first features of prior state change actions associated with the workload identity and second features of prior authentication scores associated with at least the user identity to determine probabilities of the prior state change actions occurring in their respective prior sequence combinations; and
  wherein the machine learning model is an unsupervised machine learning model or a neural network-based machine learning model.

4. The computing system of claim 3, wherein the first features comprise at least one of:
  a respective identifier for each of the prior state change actions associated with the workload identity;
  a respective time stamp indicating a time at which a respective one of the prior state change actions associated with the workload identity occurred; or
  a respective network address from which a respective one of the prior state change actions associated with the workload identity was initiated.

5. The computing system of claim 1, wherein said perform the remedial action includes at least one of:
  to remove and replace one or more active credentials of the workload identity;
  to audit administrator access to the workload identity; or
  to restrict a permission to a web application programming interface (API) of the workload identity.

6. The computing system of claim 1, wherein the anomaly score, generated for the sequence combination of the state change actions, indicates the anomalous state change as at least one of:
  a deviation in an access pattern of the workload identity;
  a creation of a new workload identity by the workload identity;
  a self-signed certificate being added to the workload identity, the workload identity previously having only one or more certificates from a single certificate authority;
  a user adding at least one first credential to the workload identity, the workload identity previously having any credentials added only by other users;
  a second credential with an atypical validity lifetime being added to the workload identity;
  a third credential being added to the workload identity that includes the workload identity in a new group, that includes the workload identity in a new directory role, or that elevates privileges of the workload identity; or
  the workload identity utilizing a plurality of different credentials at least partially concurrently from at least two different network addresses to acquire one or more tokens.

7. The computing system of claim 1, wherein said aggregating the probability values comprises:
  determining an average negative log likelihood of the probability values.

8. A method performed by a computing system, the method comprising:
  receiving activity log information corresponding to state change actions taken in a services platform for a workload identity of a service principal that is executed in the services platform, the state change actions taking place during an associated authentication to the workload identity, and involving workload identity credentials in an identity service of the services platform;
  generating, for state change actions in a sequence combination of state change actions, probability values indicative of a likelihood that a particular state change action in the sequence combination of state change actions occurs after a state change action in the sequence combination of state change actions immediately preceding the particular state change action;
  generating an anomaly score, via an action model, for the sequence combination of the state change actions by aggregating the probability values;
  determining an anomalous state change has occurred based at least on satisfaction of a threshold condition associated with the anomaly score; and
  performing a remedial action against the anomalous state change and within the services platform.

9. The method of claim 8, wherein the associated authentication to the workload identity is an authentication of a user identity via user credentials;
  the method further comprising:
    receiving an authentication score indicative of a risk assessment for the authentication of the user identity; and
    combining the authentication score with the anomaly score to generate a combined score;
  wherein satisfaction of the threshold condition associated with the anomaly score comprises the combined score satisfying the threshold condition.

10. The method of claim 9, wherein the action model is a machine learning model that is trained based at least on first features of prior state change actions associated with the workload identity and second features of prior authentication scores associated with at least the user identity to determine probabilities of the prior state change actions occurring in their respective prior sequence combinations; and
  wherein the machine learning model is an unsupervised machine learning model or a neural network-based machine learning model.

11. The method of claim 10, wherein the first features comprise at least one of:
  a respective identifier for each of the prior state change actions associated with the workload identity;
  a respective time stamp indicating a time at which a respective one of the prior state change actions associated with the workload identity occurred; or
  a respective network address from which a respective one of the prior state change actions associated with the workload identity was initiated.

12. The method of claim 8, wherein the remedial action includes at least one of:
  removing and replacing one or more active credentials of the workload identity;
  auditing administrator access to the workload identity; or
  restricting a permission to a web application programming interface (API) of the workload identity.

13. The method of claim 8, wherein the anomaly score, generated for the sequence combination of the state change actions, indicates the anomalous state change as at least one of:
  a deviation in an access pattern of the workload identity;
  a creation of a new workload identity by the workload identity;
  a self-signed certificate being added to the workload identity, the workload identity previously having only one or more certificates from a single certificate authority;

a user adding at least one first credential to the workload identity, the workload identity previously having any credentials added only by other users;

a second credential with an atypical validity lifetime being added to the workload identity;

a third credential being added to the workload identity that includes the workload identity in a new group, or that includes the workload identity in a new directory role, or that elevates privileges of the workload identity; or the workload identity utilizing a plurality of different credentials at least partially concurrently from at least two different network addresses to acquire one or more tokens.

14. The method of claim 8, wherein said aggregating the probability values comprises:

determining an average negative log likelihood of the probability values.

15. A computer-readable storage medium having program instructions recorded thereon that, when executed by at least one processor of a computing system, perform a method, the method comprising:

receiving activity log information corresponding to state change actions taken in a services platform for a workload identity of a service principal that is executed in the services platform, the state change actions
taking place during an associated authentication to the workload identity, and
involving workload identity credentials in an identity service of the services platform;

generating, for state change actions in a sequence combination of state change actions, probability values indicative of a likelihood that a particular state change action in the sequence combination of state change actions occurs after a state change action in the sequence combination of state change actions immediately preceding the particular state change action;

generating an anomaly score, via an action model, for the sequence combination of the state change actions by aggregating the probability values;

determining an anomalous state change has occurred based at least on satisfaction of a threshold condition associated with the anomaly score; and performing a remedial action against the anomalous state change and within the services platform.

16. The computer-readable storage medium of claim 15, wherein the associated authentication to the workload identity is an authentication of a user identity via user credentials; and wherein the method further comprises:
receiving an authentication risk score indicating a probability whether user credentials utilized to authenticate the user with the platform-based identity service were compromised at the time of authentication;
combining the authentication risk score and the anomaly score to generate a combined score; and
determining that the anomalous behavior has occurred based on the combined score meeting a predetermined condition.

17. The computer-readable storage medium of claim 16, wherein the action model is a machine learning model that is trained based at least on first features of prior state change actions associated with the workload identity and second features of prior authentication scores associated with at least the user identity to determine probabilities of the prior state change actions occurring in their respective prior sequence combinations; and wherein the machine learning model is an unsupervised machine learning model or a neural network-based machine learning model.

18. The computer-readable storage medium of claim 17, wherein the first features comprise at least one of:

a respective identifier for each of the prior state change actions associated with the workload identity;

a respective time stamp indicating a time at which a respective one of the prior state change actions associated with the workload identity occurred; or a respective network address from which a respective one of the prior state change actions associated with the workload identity was initiated.

19. The computer-readable storage medium of claim 15, wherein the remedial action includes at least one of:

removing and replacing one or more active credentials of the workload identity;

auditing administrator access to the workload identity; or restricting a permission to a web application programming interface (API) of the workload identity.

20. The computer-readable storage medium of claim 15, wherein the anomaly score, generated for the sequence combination of the state change actions, indicates the anomalous state change as at least one of:

a deviation in an access pattern of the workload identity;

a creation of a new workload identity by the workload identity;

a self-signed certificate being added to the workload identity, the workload identity previously having only one or more certificates from a single certificate authority;

a user adding at least one first credential to the workload identity, the workload identity previously having any credentials added only by other users;

a second credential with an atypical validity lifetime being added to the workload identity;

a third credential being added to the workload identity that includes the workload identity in a new group, or that includes the workload identity in a new directory role, or that elevates privileges of the workload identity; or the workload identity utilizing a plurality of different credentials at least partially concurrently from at least two different network addresses to acquire one or more tokens.

* * * * *